Aug. 14, 1951   B. DENZLER   2,564,196
VALVE TAP
Filed July 8, 1946
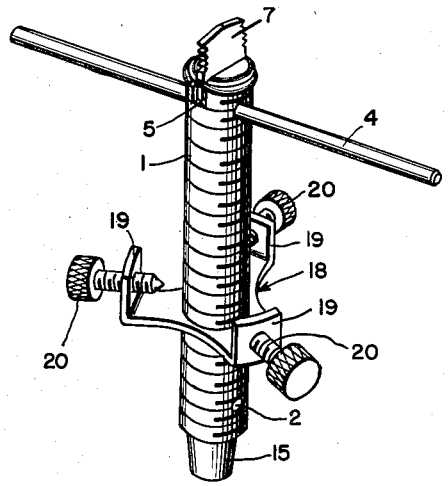
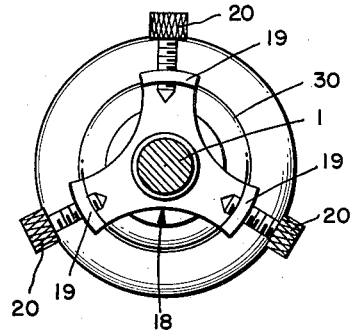
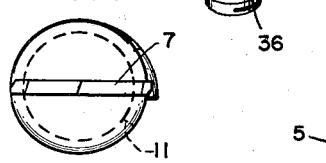
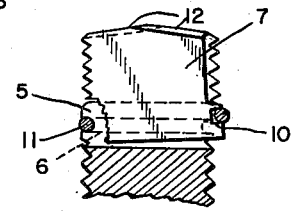
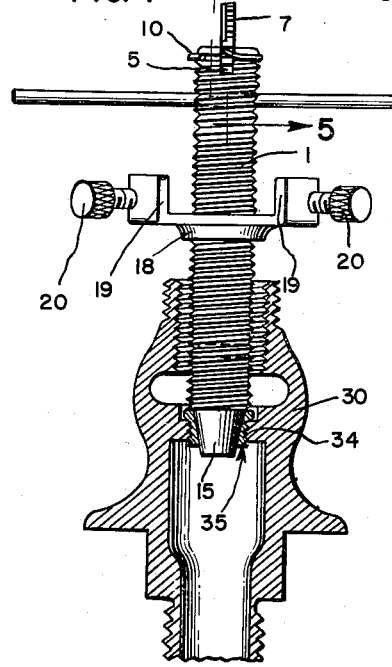
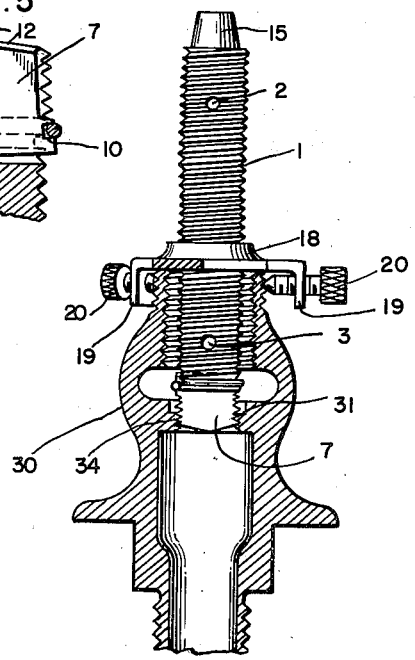
INVENTOR
BERTHOLD DENZLER
BY
ATTORNEY Patented Aug. 14, 1951

2,564,196

UNITED STATES PATENT OFFICE 2,564,196

VALVE TAP

Berthold Denzler, Chicago, Ill.

Application July 8, 1946, Serial No. 681,959

3 Claims. (Cl. 10—141)

The present invention relates to tools for facilitating the repair of the seating surface of a valve, particularly a valve such as an ordinary household type faucet.

In a household type faucet it frequently happens that the valve seat becomes worn or corroded to such an extent that it is impossible to provide a liquid-tight closure with the usual type of valve disc or washer. It is then the usual practice to regrind the valve seat. This involves removal of the original valve material and requires a great deal of care in order that the resulting seat shall be in proper alignment. A slight misalignment results in excessive wear at certain spots requiring refinishing of the seating surface after a short period of time. Since the amount of metal at the valve seat is quite small repeated grindings of the seat will soon wear down the material entirely, thus rendering the valve useless.

It is one of the objects of the present invention to provide a tool which will facilitate the performance of such operations on a leaky valve as will permit the insertion of a removable valve seat. Any wear that takes place thereafter is on the removable valve seat, which may then be removed and replaced by a new seat so that after the first machining operation and positioning of a new valve seat the resulting valve is even better than it was originally. In accordance with the present invention the valve opening which is surrounded by the usual valve seat is threaded to receive a replaceable valve seat, which replaceable valve seat is of a simple and economical construction and may be inserted in or removed from the valve as required.

It is one of the objects of the present invention to provide a simple tool which can be used to thread the valve opening in the original valve and which can also be used for insertion or removal of a seat into the threaded opening.

It is a still further object of the present invention to provide such a tool that may be easily and quickly secured to a standard offset valve and used to perform the required mechanical operations, all without removal of the offset from its piping connections. It is a still further object of the present invention to provide a tool of the above mentioned character with a self-centering tapping die so that any slight errors in the centering of the tool on the valve will not prevent the proper operation of the tool in tapping the valve opening.

The attainment of the above and further objects of the present invention will be apparent from the following specification taken in conjunction with the accompanying drawing forming a part thereof.

In the drawing:

Figure 1 is a perspective view of the tool embodying the present invention;

Figure 2 is a top view of the tool of Figure 1;

Figure 3 is a view illustrating the use of the tool for tapping a faucet valve;

Figure 4 is a view illustrating the use of the tool for removing or inserting a valve seat;

Figure 5 is an enlarged view of the tap end of the tool of Figure 1; and

Figure 6 is a top view of the tap shown in Figure 5.

The tool of the present invention comprises a lead screw 1 threaded from adjacent one end to adjacent the other end and having, adjacent each end thereof, transverse holes 2—3 for receiving a wire handle 4. The wire handle consists merely of a wire which may be slid through either hole 2—3 to facilitate turning of the lead screw.

At one end of the lead screw there is formed a transverse slot 5 and a peripherally extending groove 6. A flat sided tap 7 is inserted in the slot 5. The tap has a ring-receiving notch 10 on one side thereof and a similar notch on the other side thereof. A split spring steel snap ring 11 fits in the groove 6 of the lead screw and into the notches 10, of the tap and thus serves to hold the tap in place while permitting a certain amount of movement in the tap of the slot 5 in the direction of the planes of the opposite walls of the slot 5. The tap 7 is threaded to have exactly the same pitch as the pitch of the lead screw 1. The advancing edge of the tap is tapered, as indicated at 12, so that the tap can be self-guiding into centering position in an opening that is to be tapped. The split ring 11 permits a limited amount of tilting of the longitudinal axis of the tap out of alignment with the longitudinal axis of the lead screw to make the tap self-centering.

The opposite end of the lead screw is provided with a smooth, slightly tapered reaming surface 15. The surface 15 is a smooth frusto-conical surface having a taper of the order of one and one-half inches per foot.

A locking collar 18 is threaded on the lead screw. This collar has three lugs 19—19—19 each of which is threaded to receive a pointed thumb screw 20.

An explanation will now be given of the manner of using the tool of the present invention.

Assume that a conventional type of valve 30 has a defective valve seat 31. In order to remedy leakage of this valve a new seat is to be formed. This is accomplished by tapping the valve opening that is surrounded by the defective valve seat 31. To effect this tapping action the tool of Figure 1 is inverted, the handle 4 removed, and the tool is lowered into the valve. Thereafter the collar 18 is locked to the valve by means of the thumb screws 20, being locked in such a position that the lead screw is approximately centered over the valve opening. The lead screw is then turned until the tap thereof enters the opening in the valve. Thereafter, by means of the handle 4 which is positioned through the opening 2, the lead screw is turned, thus advancing the tap into the opening surrounded by the valve seat 31. If the lead screw was not exactly centered over the opening to be tapped then the resulting connection between the tap and the lead screw permits some shifting of the tap with respect to the lead screw, so that as the lead screw is turned and the tap is advanced it threads the inside of the valve opening surrounded by the valve seat 31. Since the threads on the tap 7 are of exactly the same pitch as the threads on the lead screw it follows that a suitable threading action is obtained. Thereafter the lead screw is turned to retract the tap from the opening that it has just threaded, and by loosening the thumb screws 20 the entire lead screw is removed from the valve. It is now necessary to position a new valve seat into the valve 30. The valve seat is indicated at 35 and comprises a short tube externally threaded, as at 36, with threads having the same pitch as the threads on the lead screw and the same diameter as that provided by the tapped hole formed by the tap 7. The inner surface of the valve seat 35 is preferably smooth. The valve seat is positioned on the tapered surface 15 and is held thereon by frictional engagement. The tap 1 is then lowered into the valve 30 in the manner indicated in Figure 4 and the valve 35 is threaded into the tapped opening 34 that has been formed in the valve 30. When the new valve seat 35 reaches its limiting position any further turning of the lead screw merely results in sliding of the surface 15 in the inner surface of the valve seat 35. The top of the new valve seat 35 constitutes a seat for the movable valve stem of the valve 30.

Should the top of the valve seat 35 subsequently become worn or corroded the valve seat 35 may be removed and replaced by a new valve seat. To remove the valve seat 35 it is merely necessary to lower the end 15 of the lead screw 1 into the valve seat 15, force it downwardly until the surface 15 grips the valve seat 35, and then by turning the lead screw the valve seat 35 may be threaded out of the valve 30 and then a new valve seat inserted in the same manner as was previously described.

From the above description it is apparent that by means of the present invention it is possible to treat a worn valve so that it may receive a removable and replaceable valve seat, thus remedying the worn valve seat condition by providing a new valve seat.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A tool for repairing a valve comprising a lead screw having a transverse slot across one end thereof, a tap having flat sides that fit in said slot, said tap having a limited freedom of movement in said slot and having a pitch exactly the same as that of the lead screw, the end of the screw where the slot is located having a peripheral groove, and a split spring snap ring in said groove and yieldingly holding the tap in said slot.

2. A tool for repairing a valve comprising a lead screw having a slot at one end thereof, a tap having sides that fit in said slot, said tap having a limited freedom of movement in said slot and having a pitch exactly the same as that of the lead screw, and means yieldingly holding the tap in said slot.

3. A tool for repairing a valve comprising a lead screw, means at one end of the screw for loosely holding a tap, a tap separate from the screw and loosely held by said means to permit a limited freedom of movement with respect to the lead screw and said tap being rotatable with the screw and having a pitch exactly the same as that of the lead screw, and means yieldingly holding the tap at the end of said screw.

BERTHOLD DENZLER.

REFERENCES CITED

The following references are of record in the file of this patent:

UNITED STATES PATENTS

| Number | Name | Date |
| --- | --- | --- |
| 177,410 | Martin | May 16, 1876 |
| 1,062,342 | MacConnell | May 20, 1913 |
| 1,888,259 | Burston | Nov. 22, 1932 |
| 2,082,461 | Pardieck | June 1, 1937 |
| 2,157,662 | Fritz | May 9, 1939 |
| 2,300,310 | Poeton | Oct. 27, 1942 |

FOREIGN PATENTS

| Number | Country | Date |
| --- | --- | --- |
| 179,725 | Canada | Oct. 16, 1917 |